(12) United States Patent
Feng et al.

(10) Patent No.: US 12,337,335 B2
(45) Date of Patent: Jun. 24, 2025

(54) BIOCHEMICAL ITEM DETECTION DISC

(71) Applicant: Hanguang Micro-nano Technology (Taicang) Co., Ltd., Suzhou (CN)

(72) Inventors: Chengyu Feng, Suzhou (CN); Yexian Wu, Suzhou (CN); Liya Sun, Suzhou (CN); Jing Chen, Suzhou (CN)

(73) Assignee: Hanguang Micro-nano Technology (Taicang) Co., Ltd., Suzhou (CN)

( * ) Notice: Subject to any disclaimer, the term of this patent is extended or adjusted under 35 U.S.C. 154(b) by 542 days.

(21) Appl. No.: 17/876,832

(22) Filed: Jul. 29, 2022

(65) Prior Publication Data

US 2023/0264205 A1 Aug. 24, 2023

(30) Foreign Application Priority Data

Feb. 24, 2022 (CN) .......................... 202210177056.9

(51) Int. Cl.
| | | |
|---|---|---|
| *B04B 5/04* | (2006.01) | |
| *B01L 3/00* | (2006.01) | |
| *B04B 11/02* | (2006.01) | |
| *G01N 1/34* | (2006.01) | |

(52) U.S. Cl.
CPC ...... *B04B 5/0442* (2013.01); *B01L 3/502753* (2013.01); *B04B 11/02* (2013.01); *G01N 1/34* (2013.01); *B01L 2200/16* (2013.01); *B01L 2300/0803* (2013.01); *B01L 2300/0877* (2013.01)

(58) Field of Classification Search
CPC . B04B 5/0442; B04B 11/02; B01L 3/502753; B01L 2200/16; B01L 2300/0803; B01L 2300/0877; B01L 2300/161; B01L 2400/0409; B01L 2400/086; B01L 2400/088; B01L 3/502738; B01L 3/50273; G01N 1/34; G01N 35/00; G01N 1/28; G01N 1/38
See application file for complete search history.

(56) References Cited

FOREIGN PATENT DOCUMENTS

| | | |
|---|---|---|
| CN | 104375919 A | 2/2015 |
| CN | 211374792 U | 8/2020 |
| CN | 216285330 U | 4/2022 |

*Primary Examiner* — Amber R Orlando
*Assistant Examiner* — Shuyi S. Liu
(74) *Attorney, Agent, or Firm* — Nitin Kaushik

(57) ABSTRACT

The present invention discloses a biochemical item detection disc. The biochemical item detection disc comprises a disc, a first detection unit and a second detection unit, wherein the first detection unit and the second detection unit are arranged on the disc. The first detection unit comprises a centrifugal bag placing tank, a first diluent dosing tank, a first sample dosing tank, a first sample dosing tank, a first mixing tank, a first liquid separating tank and first detection holes; and the second detection unit comprises a first diluent overflow tank, a second diluent dosing tank, a second sample dosing tank, a second mixing tank, a second liquid dispensing tank and second detection holes. Different dilution ratios of a single sample can be realized, which can meet detection needs of more biochemical freeze-dried reagents.

9 Claims, 3 Drawing Sheets

BIOCHEMICAL ITEM DETECTION DISC

CROSS-REFERENCE TO RELATED APPLICATIONS

The application claims priority to Chinese patent application No. 2022101770569, filed on Feb. 24, 2022, the entire contents of which are incorporated herein by reference.

TECHNICAL FIELD

The present invention relates to the field of biochemical item detection, in particular to a biochemical item detection disc.

BACKGROUND

In medical clinical diagnosis, it is necessary to obtain blood cell detection information and biochemical detection information of patients to provide more perfect guidance for clinical disease diagnosis and treatment. However, existing blood cell tests and biochemical tests are generally carried out on a blood analyzer and a biochemical analyzer respectively, so two blood samples and two different instruments must be prepared to complete the two types of tests; and the operation is complicated. Therefore, biochemical test discs are often used to quickly test plasma samples.

However, in the process of biochemical item detection, because different kinds of freeze-dried reagents need samples with different dilution ratios to achieve the best detection effect, the prior art cant meet the need of simultaneous biochemical item detection with multiple indexes for a single sample under different dilution ratios.

Therefore, a biochemical item detection disc in the prior art has the technical problems that a biochemical item detection function is single; a single sample cannot be diluted into samples with different dilution ratios; and detection needs of more biochemical freeze-dried reagents cannot be met.

SUMMARY

In view of this, the main purpose of the present invention is to provide a biochemical item detection disc with multiple functions, which can dilute a single sample into samples with different dilution ratios to meet detection needs of more biochemical freeze-dried reagents.

In order to achieve the above purpose, the technical solution of the present invention is realized as follows:

The biochemical item detection disc comprises: a disc (1), a first detection unit (2) and a second detection unit (3), wherein the first detection unit (2) and the second detection unit (3) are arranged on the disc (1);

the first detection unit (2) comprises a centrifugal bag placing tank (21), a first diluent dosing tank (22), a sample adding tank (23), a first sample dosing tank (24), a first mixing tank (25), a first liquid separation tank (26) and first detection holes (27), wherein the centrifugal bag placing tank (21) is communicated with the first diluent dosing tank (22) through a liquid inlet flow channel; the sample adding tank (23) is communicated with the first sample dosing tank (24) through a flow channel; the first diluent dosing tank (24) is communicated with the first mixing tank (25) through a first siphon flow channel (4); the first sample dosing tank (24) is communicated with the first mixing tank (25) through a second siphon flow channel (5); and the first mixing tank (25) is communicated with the first liquid separation tank (26) through a third siphon flow channel (6);

a plurality of the first detection holes (27) are arranged; and the first liquid separation tank (26) is communicated with the first detection holes (27) through the flow channel;

the second detection unit (3) comprises a first diluent overflow tank (31), a second diluent dosing tank (32), a second sample dosing tank (33), a second mixing tank (34), a second liquid separation tank (35) and second detection holes (36), wherein the first diluent overflow tank (31) is communicated with the first diluent dosing tank (24) through an overflow channel; the first diluent overflow tank (31) is communicated with the second diluent dosing tank (32) through the liquid inlet flow channel; the second sample dosing tank (33) is communicated with the first sample dosing tank (24) through the flow channel; the second diluent dosing tank (32) is communicated with the second mixing tank (34) through a fourth siphon flow channel (7); the second sample dosing tank (33) is communicated with the second mixing tank (34) through a fifth siphon flow channel (8); and the second mixing tank (34) is communicated with the second liquid separation tank (35) through a sixth siphon flow channel (9); and a plurality of the second detection holes (36) are arranged; and the second liquid separation tank (35) is communicated with the second detection holes (36) through the flow channel.

Further comprising: a sample overflow tank (10) and a sample detection hole (11), wherein the sample overflow tank (10) is communicated with the second sample dosing tank (33) through the overflow channel; and the sample detection hole (11) is communicated with the sample overflow tank (10) through the flow channel.

Further comprising: a second diluent overflow tank (12) and a diluent detection hole (13), wherein the second diluent overflow tank (12) is communicated with the second diluent dosing tank (32) through the overflow channel; and the diluent detection hole (13) is communicated with the second diluent overflow tank (12) through the flow channel.

Further, wherein the first sample dosing tank (24) and the second sample dosing tank (33) are respectively communicated with red blood cell separation tanks (14).

Further, wherein the back of the disc (1) is fixedly connected with a positioning device (15); the positioning device (15) has a dodecagonal structure, the height of which is 1 mm-5 mm; and the dodecagonal structure is provided with a plurality of circular grooves, so that the disc (1) and an instrument can be accurately fixed.

Further, wherein the disc (1) is provided with an iron plate clamping groove; and an iron plate is arranged in the iron plate clamping groove.

Further, wherein the widths of the first siphon flow channel (4), the second siphon flow channel (5), the third siphon flow channel (6), the fourth siphon flow channel (7), the fifth siphon flow channel (8) and the sixth siphon flow channel (9) are 0.2 mm-0.5 mm; and the depths are 0.1 mm-0.5 mm; and surfaces of the first siphon flow channel (4), the second siphon flow channel (5), the third siphon flow channel (6), the fourth siphon flow channel (7), the fifth siphon flow channel (8) and the sixth siphon flow channel (9) are hydrophily modified.

Further, wherein the upper surface of the disc (1) is bonded with a film; the film may be one of a PET pressure sensitive film, a PC film, a PMMA film and a PS film; and the thickness of the film is 0.05 mm-0.2 mm.

Further, wherein the disc (1) is provided with a black glue block (16); and the black glue block (16) is fixedly connected with the edge of the disc (1).

The biochemical item detection disc of the present invention has the following beneficial effects:

the biochemical item detection disc comprises: a disc, a first detection unit and a second detection unit, wherein the first detection unit and the second detection unit are arranged on the disc; the first detection unit comprises a centrifugal bag placing tank, a first diluent dosing tank, a sample adding tank, a first sample dosing tank, a first mixing tank, a first liquid separation tank and first detection holes; the centrifugal bag placing tank is communicated with the first diluent dosing tank through a liquid inlet flow channel; the sample adding tank is communicated with the first sample dosing tank through a flow channel; the first diluent dosing tank is communicated with the first mixing tank through a first siphon flow channel; the first sample dosing tank is communicated with the first mixing tank through a second siphon flow channel; the first mixing tank is communicated with the first liquid separation tank through a third siphon flow channel; a plurality of the first detection holes are arranged; and the first liquid separation tank is communicated with the first detection holes through the flow channel; and the second detection unit comprises a first diluent overflow tank, a second diluent dosing tank, a second sample dosing tank, a second mixing tank, a second liquid separation tank and second detection holes; the first diluent overflow tank is communicated with the first diluent dosing tank through an overflow channel; the first diluent overflow tank is communicated with the second diluent dosing tank through the liquid inlet flow channel; the second sample dosing tank is communicated with the first sample dosing tank through the flow channel; the second diluent dosing tank is communicated with the second mixing tank through a fourth siphon flow channel; the second sample dosing tank is communicated with the second mixing tank through a fifth siphon flow channel; and the second mixing tank is communicated with the second liquid separation tank through a sixth siphon flow channel; a plurality of the second detection holes are arranged; and the second liquid separation tank is communicated with the second detection holes through the flow channel.

A diluent in the first diluent dosing tank and a sample in the first sample dosing tank are mixed in the first mixing tank; and the diluent in the second diluent dosing tank and the sample in the second sample dosing tank are mixed in the second mixing tank, so that there are two dilution ratios of a plasma sample on the disc. Different dilution ratios of the single sample can be realized by the first detection unit and the second detection unit, which can meet the detection needs of more biochemical freeze-dried reagents. Meanwhile, the disc is equipped with a whole blood plasma separation structure, which can be used for pretreatment of whole blood, that is, plasma separation, thereby realizing diversification of functions of the disc.

DETAILED DESCRIPTION OF THE EMBODIMENTS

Figure 1:
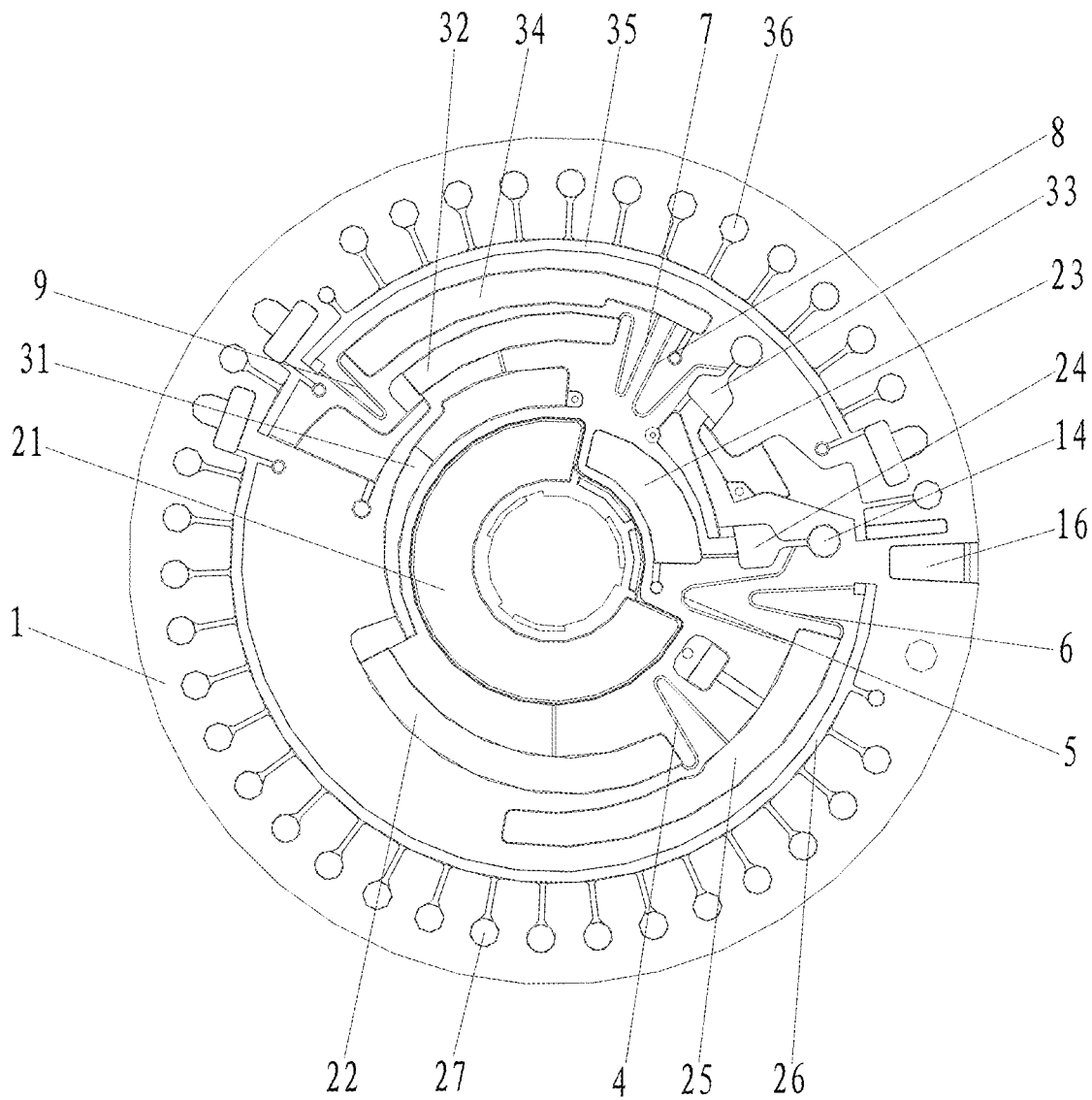
FIG. 1 is a top view of a biochemical item detection disc according to one embodiment of the present disclosure.
Figure 2:
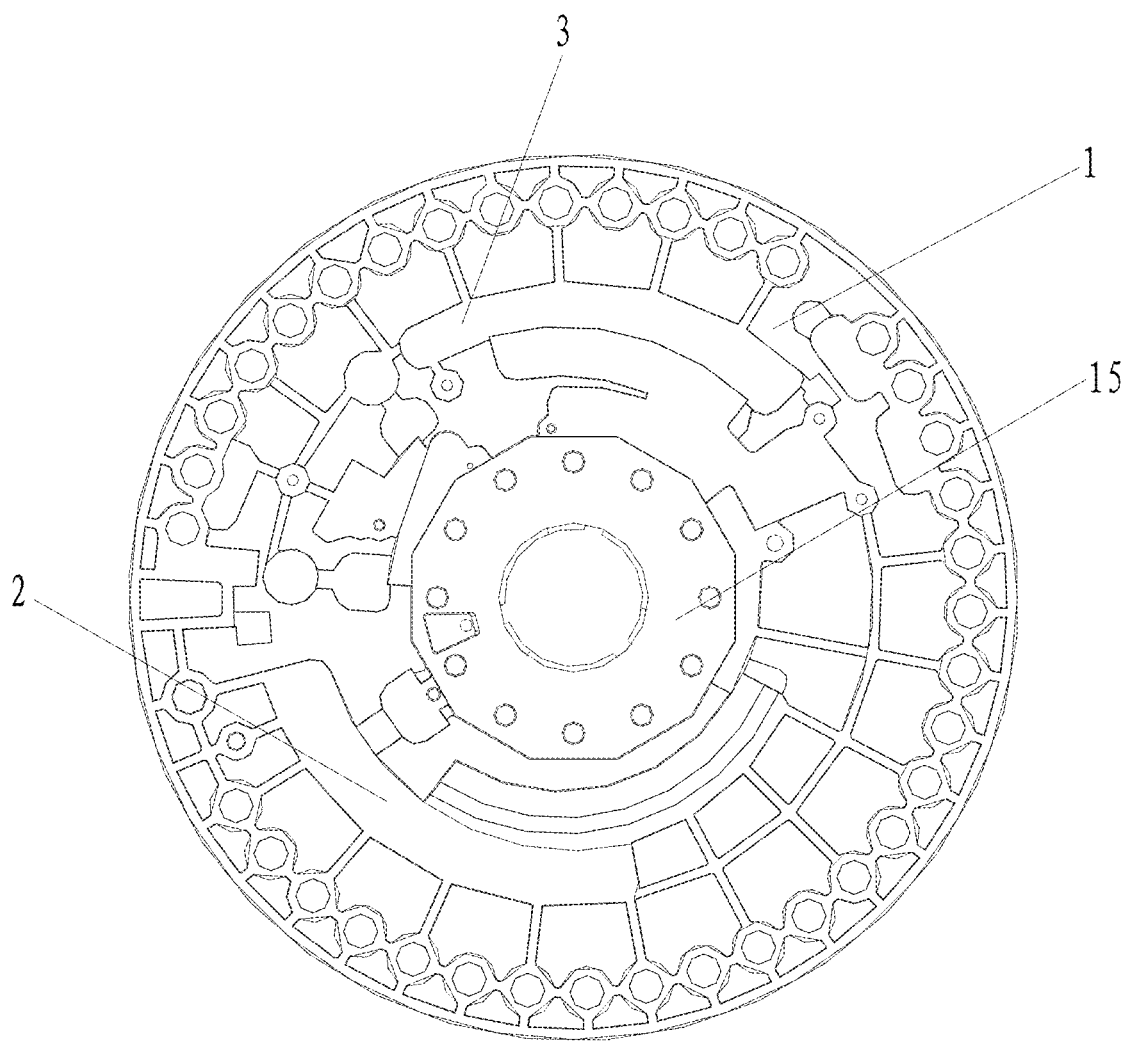
FIG. 2 is a bottom view of a biochemical item detection disc according to one embodiment of the present disclosure.
Figure 3:
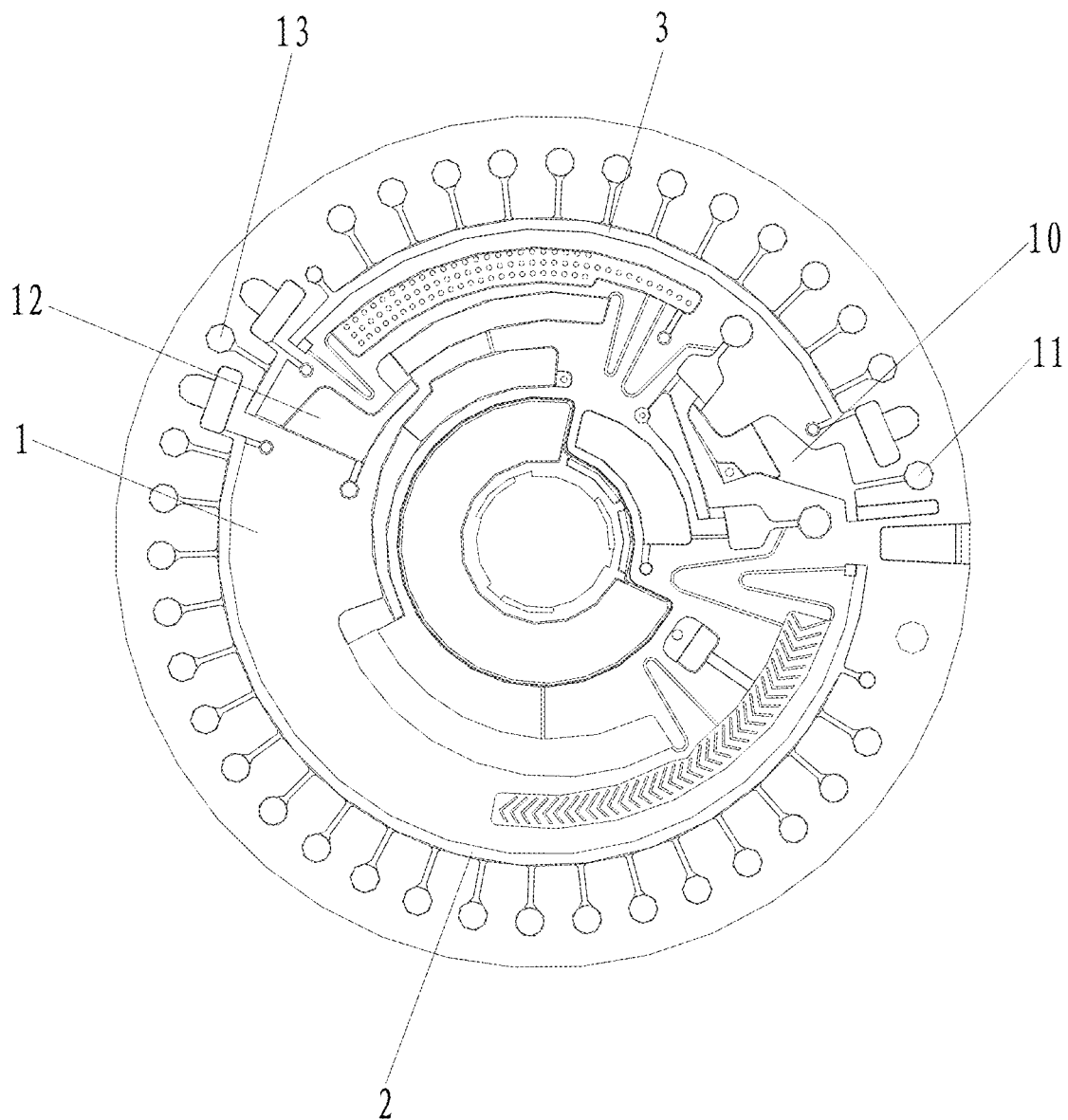
FIG. 3 is a schematic structural diagram of a biochemical item detection disc according to one embodiment of the present disclosure.

A biochemical item detection disc according to the present invention will be further explained in detail with reference to the following drawings and embodiments of the present invention.

A biochemical item detection disc comprises: a disc 1, a first detection unit 2 and a second detection unit 3, wherein the first detection unit 2 and the second detection unit 3 are arranged on the disc 1.

The first detection unit 2 comprises a centrifugal bag placing tank 21, a first diluent dosing tank 22, a sample adding tank 23, a first sample dosing tank 24, a first mixing tank 25, a first liquid separation tank 26 and first detection holes 27, wherein the centrifugal bag placing tank 21 is communicated with the first diluent dosing tank 22 through a liquid inlet flow channel; the sample adding tank 23 is communicated with the first sample dosing tank 24 through a flow channel; the first diluent dosing tank 24 is communicated with the first mixing tank 25 through a first siphon flow channel 4; the first sample dosing tank 24 is communicated with the first mixing tank 25 through a second siphon flow channel 5; and the first mixing tank 25 is communicated with the first liquid separation tank 26 through a third siphon flow channel 6.

A plurality of the first detection holes 27 are arranged; and the first liquid separation tank 26 is communicated with the first detection holes 27 through the flow channel.

The second detection unit 3 comprises a first diluent overflow tank 31, a second diluent dosing tank 32, a second sample dosing tank 33, a second mixing tank 34, a second liquid separation tank 35 and second detection holes 36, wherein the first diluent overflow tank 31 is communicated with the first diluent dosing tank 24 through an overflow channel; the first diluent overflow tank 31 is communicated with the second diluent dosing tank 32 through the liquid inlet flow channel; the second sample dosing tank 33 is communicated with the first sample dosing tank 24 through the flow channel; the second diluent dosing tank 32 is communicated with the second mixing tank 34 through a fourth siphon flow channel 7; the second sample dosing tank 33 is communicated with the second mixing tank 34 through a fifth siphon flow channel 8; and the second mixing tank 34 is communicated with the second liquid separation tank 35 through a sixth siphon flow channel 9.

A plurality of the second detection holes 36 are arranged; and the second liquid separation tank 35 is communicated with the second detection holes 36 through the flow channel.

In one implementation, a diluent centrifugal bag is placed in the centrifugal bag placing tank 21; and an aluminum foil strip above the diluent centrifugal bag is torn before use. When the biochemical item detection disc is used for biochemical item detection, a plasma sample and a diluent are injected into the sample adding tank 23 and the centrifugal bag placing tank 21, respectively.

In one implementation, the diameter of the first detection holes 27 and the second detection holes 36 is 2 mm-4 mm; the depth is 1 mm-4 mm; and freeze-died reagents for biochemical detection are embedded in the first detection holes 27 and the second detection holes 36. To prevent the interference between different biochemical test items, not every detection hole is filled with the reagents; and several detection holes will be arranged between the embedded reagents. According to the biochemical test items (such as a liver function disc, a kidney function disc, etc.), positions of the reagents on the disc 1 will be determined.

In one implementation, volumes of the first diluent dosing tank 22 and the second diluent dosing tank 32 are different; and volumes of the first sample dosing tank 24 and the second sample dosing tank 33 are different. The diluent in the first diluent dosing tank 22 and the sample in the first sample dosing tank 24 are mixed in the first mixing tank 25; and the diluent in the second diluent dosing tank 32 and the sample in the second sample dosing tank 33 are mixed in the second mixing tank 34, so that there are two dilution ratios of a plasma sample on the disc 1. Further, the two dilution ratios of the plasma sample can be determined by controlling amounts of the injected diluent and sample; and the dilution ratios may be any two in the range of 1:10 to 1:100.

In one implementation, a plurality of the first detection units 2 and a plurality of the second detection units 3 may be arranged on the disc 1; and the plasma sample can be divided into different dilution ratios by the first detection units 2 and the second detection units 3, so as to meet detection needs of more biochemical freeze-dried reagents. Meanwhile, the disc 1 is equipped with a whole blood by plasma separation structure, which can be used for pretreatment of whole blood, that is, plasma separation, thereby realizing diversification of functions of the disc 1.

In one implementation, fishbone structures or small columns are added in the first mixing tank 25 and the second mixing tank 34, so that the height of the fishbone structures and the small columns is 0.5 mm-1 mm. In a centrifugal state, the plasma sample and diluent are uniformly mixed in the first mixing tank 25 and the second mixing tank 34 by accelerating and decelerating. Existence of the fishbone structures and the small columns can aggravate liquid turbulence in the first mixing tank 25 and the second mixing tank 34 and enhance mixing of the plasma sample and the diluent.

In one implementation, the upper and lower edges of the first diluent dosing tank 22 and the second diluent dosing tank 32 are all circular arcs; the circular arcs are not concentric with the center of the disc 1; and the leftmost end of each circular arc is offset toward the center of the disc relative to the rightmost end, thereby reducing generation of bubbles in the first diluent dosing tank 22 and the second diluent dosing tank 32 and improving dosing accuracy.

In one implementation, the depths of the first sample dosing tank 24 and the second sample dosing tank 33 are greater than or equal to 0.5 mm, so that the problem that, when the depths of the first sample dosing tank 24 and the second sample dosing tank 33 are less than 0.5 mm, bubbles will be generated in the first sample dosing tank 24 and the second sample dosing tank 33 due to a shallow liquid layer, which will lead to inaccurate quantitative results, can be solved.

In one implementation, there is a step with a height greater than 1 mm in the first diluent overflow tank 31; and existence of the step can prevent the diluent from flowing back to the first diluent dosing tank 22.

In order to set a plasma control sample, the biochemical item detection disc further comprises a sample overflow tank 10 and a sample detection hole 11, wherein the sample overflow tank 10 is communicated with the second sample dosing tank 33 through an overflow channel; and the sample detection hole 11 is communicated with the sample overflow tank 10 through the flow channel.

In order to set a diluent control sample, the biochemical item detection disc further comprises a second diluent overflow tank 12 and a diluent detection hole 13, wherein the second diluent overflow tank 12 is communicated with the second diluent dosing tank 32 through the overflow channel; and the diluent detection hole 13 is communicated with the second diluent overflow tank 12 through the flow channel.

In order to separate plasma from the whole blood sample, the first sample dosing tank 24 and the second sample dosing tank 33 are respectively communicated with red blood cell separation tanks 14.

In order to realize accurate fixation of the disc 1, the back of the disc 1 is fixedly connected with a positioning device 15; the positioning device 15 has a dodecagonal structure, the height of which is 1 mm-5 mm; and the dodecagonal structure is provided with a plurality of circular grooves which are matched with protruding glass beads on an instrument tray, so that the disc 1 and an instrument can be accurately fixed.

Further, the disc 1 is provided with an iron plate clamping groove; and an iron plate is arranged in the iron plate clamping groove and matched with a magnet on the instrument tray. When the disc 1 is placed on the instrument tray, the disc 1 will be automatically sucked into the tray by magnetic force, and accurately positioned by the dodecagonal structure and the circular grooves on the disc 1.

In order to ensure the sample can pass through the siphon flow channels smoothly, the widths of the first siphon flow channel 4, the second siphon flow channel 5, the third siphon flow channel 6, the fourth siphon flow channel 7, the fifth siphon flow channel 8 and the sixth siphon flow channel 9 are 0.2 mm-0.5 mm; the depths are 0.1 mm-0.5 mm; and surfaces of the first siphon flow channel 4, the second siphon flow channel 5, the third siphon flow channel 6, the fourth siphon flow channel 7, the fifth siphon flow channel 8 and the sixth siphon flow channel 9 are hydrophily modified.

In order to seal the disc 1, the upper surface of the disc 1 is bonded with a film; the film may be one of a PET pressure sensitive film, a PC film, a PMMA film and a PS film; and the thickness of the film is 0.05 mm-0.2 mm.

In order to facilitate positioning of the detection holes on the disc 1, the disc 1 is provided with a black glue block 16; and the black glue block 16 is fixedly connected with the edge of the disc 1. An instrument optical coupler determines an initial position by reading light transmission intensity of the black glue block 16, so as to determine the position of each detection hole. Compared with a traditional prism positioning method, space of the disc 1 can be saved; and more detection holes can be arranged on the disc 1.

To facilitate extraction of a redundant diluted sample, air holes are arranged beside the first mixing tank 25 and the second mixing tank 34, so that the first mixing tank 25 and the second mixing tank 34 are communicated with the air holes through the flow channel; the diameter of the air holes should be larger than 1 mm; and the cross-sectional area of the air holes should be larger than that of the siphon flow channel, so that the air pressure inside the disc 1 can be kept stable.

The above description is only a preferred embodiment of the present invention, and is not intended to limit the scope of protection of the present invention.

What is claimed is:

1. A biochemical item detection disc, comprising:
   a disc (1),
   a first detection unit (2) and
   a second detection unit (3), wherein the first detection unit (2) and the second detection unit (3) are arranged on the disc (1);

the first detection unit (2) comprises a centrifugal bag placing tank (21), a first diluent dosing tank (22), a sample adding tank (23), a first sample dosing tank (24), a first mixing tank (25), a first liquid separation tank (26) and first detection holes (27), wherein the centrifugal bag placing tank (21) is communicated with the first diluent dosing tank (22) through a liquid inlet flow channel;

the sample adding tank (23) is communicated with the first sample dosing tank (24) through a first flow channel;

the first diluent dosing tank (24) is communicated with the first mixing tank (25) through a first siphon flow channel (4);

the first sample dosing tank (24) is communicated with the first mixing tank (25) through a second siphon flow channel (5); and the first mixing tank (25) is communicated with the first liquid separation tank (26) through a third siphon flow channel (6);

a plurality of the first detection holes (27) are arranged; and the first liquid separation tank (26) is communicated with the first detection holes (27) through a plurality of separate flow channels;

the second detection unit (3) comprises a first diluent overflow tank (31), a second diluent dosing tank (32), a second sample dosing tank (33), a second mixing tank (34), a second liquid separation tank (35) and second detection holes (36), wherein the first diluent overflow tank (31) is communicated with the first diluent dosing tank (24) through an overflow channel;

the first diluent overflow tank (31) is communicated with the second diluent dosing tank (32) through the liquid inlet flow channel;

the second sample dosing tank (33) is communicated with the first sample dosing tank (24) through a second flow channel;

the second diluent dosing tank (32) is communicated with the second mixing tank (34) through a fourth siphon flow channel (7);

the second sample dosing tank (33) is communicated with the second mixing tank (34) through a fifth siphon flow channel (8); and the second mixing tank (34) is communicated with the second liquid separation tank (35) through a sixth siphon flow channel (9); and a plurality of the second detection holes (36) are arranged; and the second liquid separation tank (35) is communicated with the second detection holes (36) through the plurality of separate flow channels.

2. The biochemical item detection disc according to claim 1, further comprising:

a sample overflow tank (10) and a sample detection hole (11), wherein the sample overflow tank (10) is communicated with the second sample dosing tank (33) through a first overflow channel; and the sample detection hole (11) is communicated with the sample overflow tank (10) through a third flow channel.

3. The biochemical item detection disc according to claim 1, further comprising:

a second diluent overflow tank (12) and a diluent detection hole (13), wherein the second diluent overflow tank (12) is communicated with the second diluent dosing tank (32) through a first overflow channel; and the diluent detection hole (13) is communicated with the second diluent overflow tank (12) through a third flow channel.

4. The biochemical item detection disc according to claim 1, wherein the first sample dosing tank (24) and the second sample dosing tank (33) are respectively communicated with red blood cell separation tanks (14), wherein the first sample dosing tank (24) and the second sample dosing tank (33) are each connected to a respective red blood cell separation tank of the red blood cell separation tanks (14).

5. The biochemical item detection disc according to claim 1, wherein the back of the disc (1) is fixedly connected with a positioning device (05); the positioning device (15) has a dodecagonal structure, the height of which is 1 mm-5 mm; and the dodecagonal structure is provided with a plurality of circular grooves, so that the disc (1) and an instrument can be accurately fixed.

6. The biochemical item detection disc according to claim 1, wherein the disc (1) comprises an iron plate clamping groove, and an iron plate is fixedly arranged in the iron plate clamping groove.

7. The biochemical item detection disc according to claim 1, wherein the widths of the first siphon flow channel (4), the second siphon flow channel (5), the third siphon flow channel (6), the fourth siphon flow channel (7), the fifth siphon flow channel (8) and the sixth siphon flow channel (9) are 0.2 mm-0.5 mm; and the depths are 0.1 mm-0.5 mm; and surfaces of the first siphon flow channel (4), the second siphon flow channel (5), the third siphon flow channel (6), the fourth siphon flow channel (7), the filth siphon flow channel (8) and the sixth siphon flow channel (9) are hydrophily modified.

8. The biochemical item detection disc according to claim 1, wherein the upper surface of the disc (1) is bonded with a film; the film may be one of a PET pressure sensitive film, a PC film, a PMMA film and a PS film; and the thickness of the film is 0.05 mm-0.2 mm.

9. The biochemical item detection disc according to claim 1, wherein the disc (1) is provided with a black glue block (16); and the black glue block (16) is fixedly connected with the edge of the disc (1).

* * * * *